May 5, 1936.  G. W. HOLLIS  2,039,485
SEED PLANTER
Filed Dec. 5, 1934   3 Sheets—Sheet 3

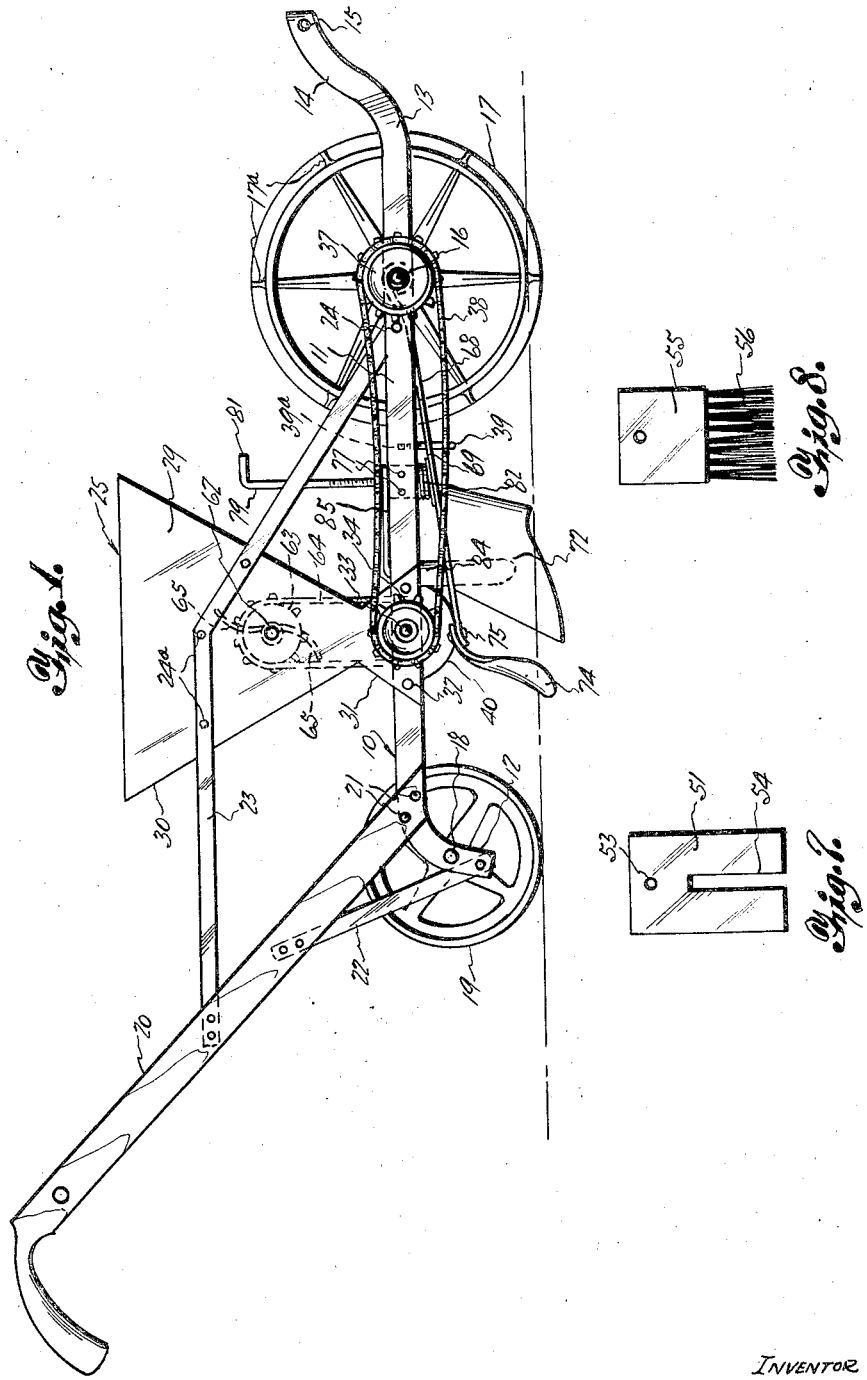

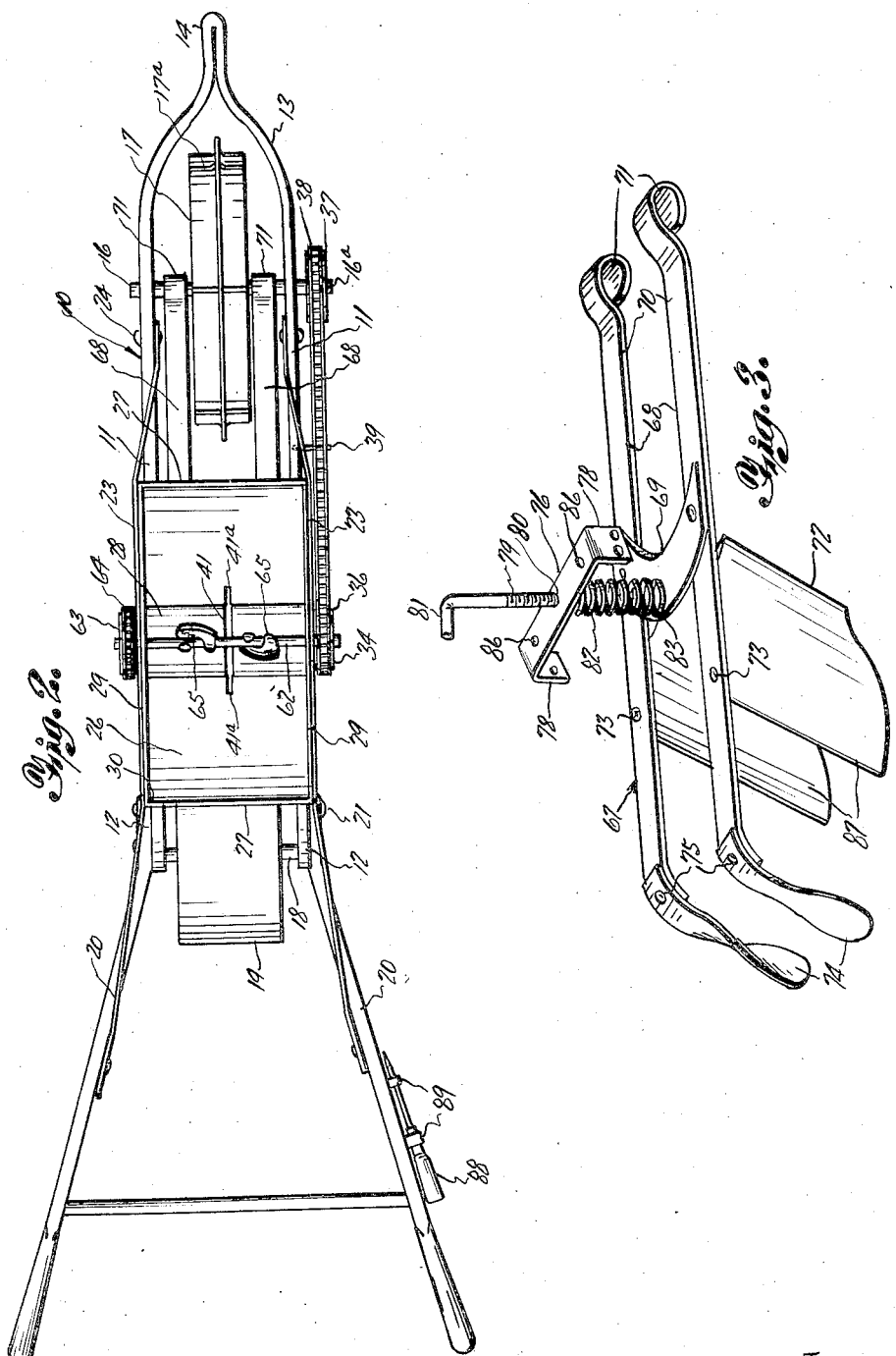

INVENTOR
GRADY W. HOLLIS
By Adam E. Fisher
ATTORNEY

Patented May 5, 1936

2,039,485

UNITED STATES PATENT OFFICE 2,039,485

SEED PLANTER

Grady W. Hollis, Lillie, La.

Application December 5, 1934, Serial No. 756,024

3 Claims. (Cl. 221—130)

My invention relates to improvements in seed planters and the main object is to provide a planter of simple, inexpensive and durable construction and which is designed particularly for the convenient and proper planting of cotton seed.

Another object is to provide a planter of this kind which by ready and conveniently made adjustments may be used as well for planting corn and all other grain and seeds which are planted in rows.

Another object is to provide a planter having adjusting means to vary the distance between "hills" or plantings as well as the quantity of seed in each hill, this and other adjustments of the planter being readily carried out with only a screwdriver as a tool.

Another object is to provide a planter having a novel and advantageous seed dropping mechanism wherein the seed is placed in a hopper across the bottom of which a seed wheel turns, the said wheel having extensible screw threaded plungers which radially projecting from the periphery of the wheel travel through the seed in the hopper and force a portion thereof, out through slotted seed blocks in the sides of the hopper where the seeds fall through a seed funnel or chute to the ground. Said seed wheel is driven by sprocket chains from the main supporting wheel of the planter and a furrow is opened to receive the seed by a V-shaped plow carried forwardly of the seed funnel and the seed is then covered by covering shovels disposed rearwardly of the plow.

Another object is to provide a planter wherein the slotted seed blocks are readily replaceable by brushes which will hold in loose grain such as corn and the seed wheel has large headed set screws which may be screwed down into the wheel forming seed cups of adjustable depth to receive and carry the seed down into the funnel.

With these and other objects and advantages in view the invention resides in the novel construction and arrangement of parts as hereinafter fully set forth and claimed, reference being had to the accompanying drawings wherein one preferred embodiment of my invention is shown for purposes of exemplification and wherein:

Figure 1 is a side view of my planter.

Figure 2 is a plan view.

Figure 3 is an enlarged perspective view of the furrow opening plow covering shovels and their supporting means alone.

Figure 7 is a detached enlarged elevation of one of the slotted cotton seed blocks.

Figure 8 is a similar view of one of the brushes.

Figure 4:
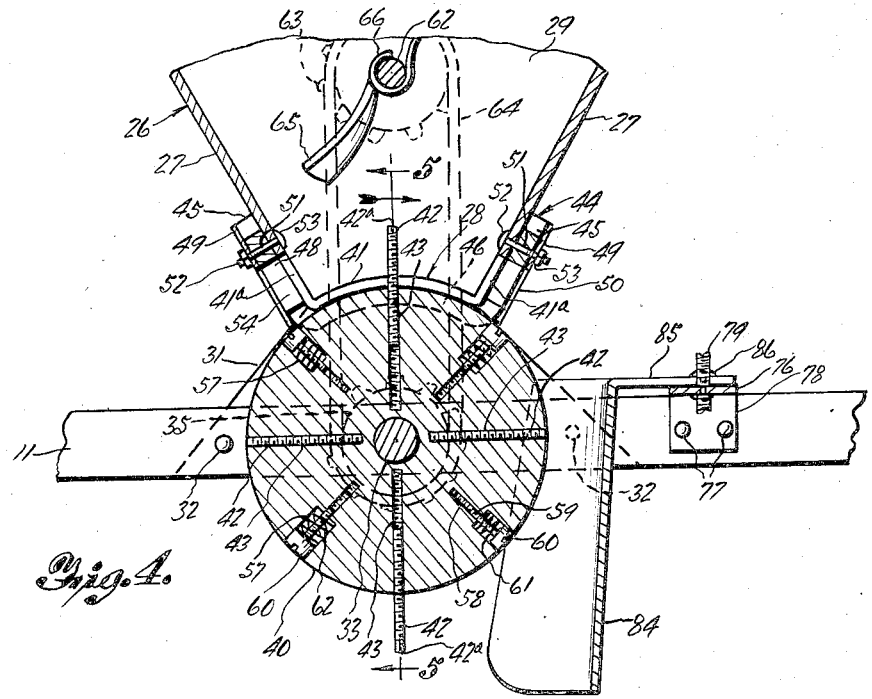
Figure 4 is an enlarged cross section through the lower portion of the seed hopper, the seed wheel and associated parts.
Figure 5:
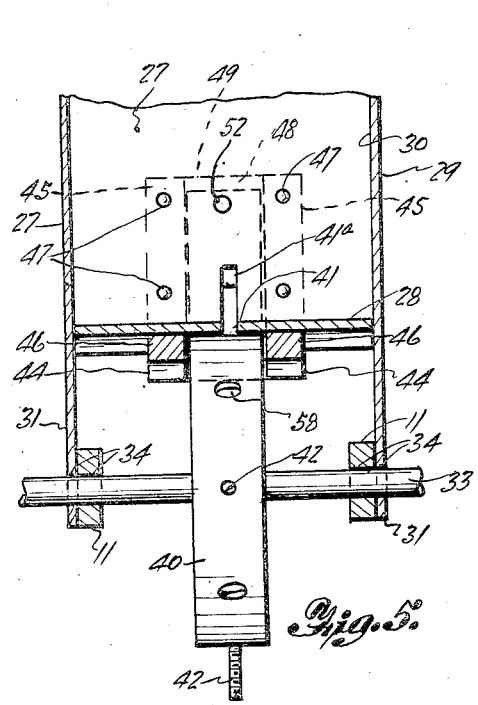
Figure 5 is a section along the line 5—5 in Figure 4.
Figure 6:
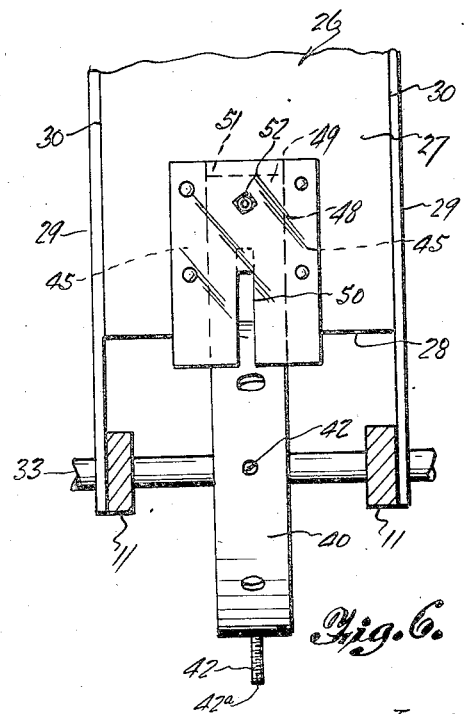
Figure 6 is a rear elevation of the parts shown in Figure 4.

Referring now with more particularity to the drawings my invention comprises a frame or chassis designated generally at 10 and made up of one piece of channel or angle iron bent up in substantially U-shape to provide spaced parallel side rails 11 bent downward at their intended rear ends 12 and joined at their frontal ends by the bight 13 which has an upwardly and forwardly bent tongue 14 apertured at 15 to act as a draft hitch. Adjacent said bight 13 a front axle 16 is journaled through the rails 11 and a large drive wheel 17 with traction cleats 17a is secured to this axle within the frame. A rear axle 18 is similarly journaled between the downturned rear ends 12 of the frame and a small, wide treaded rear wheel 19 is secured on this axle between these ends. The chassis is thus wheel supported in horizontal position to travel over the field and conventional handles or handle bars 20 are secured at 21 to the rear portion of the chassis and extend rearwardly and upwardly therefrom for the usual purpose. The handles 20 are braced by braces 22 extended to the ends 12 of the frame and by forwardly and downwardly directed braces 23 secured near the frontal end of the frame at 24.

A seed hopper 25 is mounted on the chassis 10 some distance behind the front wheel 17 and is made up of a substantially V-shaped and downwardly converging one piece center section or body 26 having ends 27 and upwardly bowed bottom 28 and covered by correspondingly shaped sides 29 secured to the center section at the corners 30 by welding or other suitable means. These sides 29 flare outwardly to form mounting tangs or feet 31 which slip down over and outside of the chassis rails 11 and are secured thereto at 32 so that the hopper is supported with its bottom 28 some distance above the chassis as shown. The hopper is further braced by fastening its sides to the braces 23 as shown at 24a. Directly and centrally below the hopper bottom 28 a seed wheel drive shaft 33 is journaled crosswise through bearing apertures 34 in the rails 11 and hopper feet 31 and this shaft extends at each end outwardly from the chassis to receive sprocket wheels 34 and 35 which are secured thereon by cotter keys or other suitable means. Likewise the front axle 16 extends at one end 16a outwardly and receives a similarly mounted drive sprocket wheel 37 which is connected by a sprocket chain 38 to the sprocket 34. This chain runs over and is supported by an L-shaped hook 39 screwed at 39a in the adjacent side rail 11 and as the planter moves forwardly the seed wheel shaft 33 is rotated in the direction shown by the arrow in Figure 4. A seed wheel 40 of solid metal or other suitable material and relatively narrow tread is secured rigidly on the shaft 33 midway between the side rails 11 and this wheel is of such diameter as to just fit nicely up into the arcuate cavity below the bottom 28 of the hopper 25 which bottom is formed on a curvature corresponding to the contiguous arc of the wheel periphery as clearly shown. Said hopper bottom 28 is slotted at 41 directly over the wheel 40 and said slot extends also a short distance up the hopper ends 27 as at 41a as shown. The slot 41 and extensions 41a are of sufficient width to expose a substantial center strip of the seed wheel periphery.

Seed plungers or fingers 42 in the form of long threaded rods or shafts having screw driver kerfs 42a in their outer ends are threaded into radially extended and equally spaced bores or sockets 43 in the seed wheel 40 and these plungers may be screwed entirely into and hidden in the sockets or may be unscrewed to project radially to any distance from the periphery of the wheel as shown. Four of the plungers are shown in the drawings but more or less may be placed in the wheel and any or all may be unscrewed for use as will be understood. When extended the fingers will pass across the bottom of the hopper through the slot 41—41a and when seed is placed in the hopper will pick up and force a part of this seed out through the frontal slot extension 41a so that the seed will drop forwardly over the wheel to the ground. The amount of seed thus forced out of the hopper may be varied readily by screwing the plungers out or in and the frequency in which droppings are made may be varied by using more or less of the plungers. The frequency of dropping, of course, regulates the distance between hills as the planter travels over the field. Further variation may be provided for by varying the ratio between the sprockets 34 and 37.

This form of seed dropping is particularly designed for cotton seed planting since these seeds have a tendency to cling together in a mass and the seed will not fall from the hopper except as forced out by the plungers 42 as described. For planting other seeds and particularly loose seeds such as corn and the like, other seed dropping means are provided as will be set forth hereinafter.

Side bars 44 are provided on each side of the seed wheel 40 and are shaped to correspond to the shape of the lower portion of the hopper 25 having upwardly flaring ends 45 slipping over the lower portions of the hopper ends 27 and upwardly bowed bights 46 fitting tight up against the hopper bottom 28. The bars 44 are secured in place by rivets 47 through their ends 45 and the adjacent walls of the hopper and being spaced apart the width of the wheel 40 form pockets 48 between the ends 45 which are enclosed by flat tin plates 49 secured under the rivets 47 as shown and extending down over the ends 45 to the periphery of the wheel 40 below. Of course, these plates 49 are slotted as shown at 50 to clear the plungers 42 as the seed wheel rotates. The bars 44 are relatively thick as shown whereby the pockets 48 between their ends 45 are of substantial depth and are adapted to receive rectangular cotton seed blocks 51. These blocks 51 are of such thickness and size as to drop nicely into the pockets 48 where they are secured by small bolts 52 passed through aligned apertures 53 in the hopper ends 27, the top of the blocks and the plates 49 as shown and the blocks are also slotted as at 54 to clear the plungers 42.

For planting loose or granular seeds such as corn the cotton seed blocks 51 are removed and replaced with brush blocks 55 similar in size, shape and mounting means but instead of the slots 54 having stiff bristles 56 on their lower ends which will engage the periphery of the seed wheel 40 and prevent the seed from falling out of the hopper through the clearance slots in the plates 49. The cotton seed plungers 42 are of course screwed entirely into the wheel and the seed in this case is picked up in cups or sockets 57 formed in the periphery of the wheel at equally spaced points between the plungers 42. These cups 57 have reduced and tapped inward extensions 58 in which set screws 59 are threaded and the heads 60 of the screws are arranged to close all or any part of the cups by moving the screws in or out as will be understood. Springs 61 braced behind or inwardly of the heads 60 hold the screws in adjusted position. For corn planting the screws 59 are moved inwardly and the cups 57 will be filled with the kernels or grains as the wheel 40 rotates and these kernels will be carried out beneath the frontal brush blocks 55 and thence dropped to the ground. The quantity of corn picked up in the cups may be varied by the screws 59 and by varying the diameter of the cups themselves and as before the distance between hills may be varied by using more or less of the cups.

An agitator shaft 62 is journaled horizontally through the sides 29 of the hopper some distance above and parallel to the seed wheel shaft 33 and is extended outwardly at one end over the sprocket 35 on said shaft 33. A similar sprocket 63 is secured in this end of the agitator shaft and a sprocket chain 64 is trained over sprockets 35 and 63 whereby said agitator shaft 62 is rotated as the planter travels. Within the hopper curved agitator blades 65 are secured at 66 to the agitator shaft 62 and act to continuously work and agitate the seed in the hopper to facilitate its feeding down and out through the bottom.

A furrow forming and covering assembly 67 shown in detail in Figure 3 is provided and same comprises two elongated parallel arms 68 secured together in spaced relation by a cross bar 69 so that the frontal ends 70 may pass one on either side of the front wheel 17 and formed with eyes 71 at these frontal ends to pivotally engage the front axle 16. The arms 68 thus extend back and may swing down from the said front axle and just forwardly of the seed wheel 40 carry a V-shaped opened plow 72 secured at 73 and arranged to penetrate the ground surface and form a furrow therein. Covering shovels 74 are secured at 75 to the rear ends of the arms 68 and are set at such angle as to cover the furrow after it is formed by the opener 72. A bracket 76 is secured by rivets 77 through its downturned ends 78 between the side rails 11 just behind the wheel 17 and an adjusting screw 79 is threaded at 80 down through the center of this bracket. At its upper end the screw 79 has an offset handle 81 and at its lower end is attached to an expansion coil spring 82 in turn anchored at 83 to the center of the cross bar 69. Thus by turning this screw 79 the arms 68 and attached opener 72 and shovels 74 may be raised or lowered to vary the depth of the planting while these parts are at all times pressed downward resiliently by the spring 82. A seed funnel 84 of trough-like or U-shaped cross section is mounted in vertical position forwardly of and over the seed wheel 40 and is supported by forwardly turned ears 85 secured at 86 to the bracket 76. The funnel 84 drops down between the flaring sides 87 of the opener plow 72 and carries the seed from the wheel 40 directly down into the furrow as it is formed by the opener.

Since the seed funnel 84 is fastened to the bracket 76 it remains stationary no matter how the arms 68, plow 72 and shovels 74 may move. An important advantage lies in the use of the slotted seed blocks 51 in that the seed as it is carried into the slot 54 is pocketed and is readily picked up and carried out by the plungers 42. Such would not be the case could the seed escape around the sides of the plungers as would be true if these blocks were not used and were not relatively thick as shown.

From the foregoing it is thought that the operation of my planter will be readily understood and it will be evident that the operation is simple and practical. All adjustments may be readily made with only one tool, a screwdriver, and same designated at 88 in Figure 2 may be conveniently carried in straps 89 on one of the handles 20. This is of great advantage since the variety of tools necessary with other implements of the kind are so often lost and mislaid.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In a planter, a wheel borne frame, a hopper mounted on the frame and including an upwardly bowed bottom and having a slot through its bottom, a seed wheel journaled below the hopper bottom and fitting closely against the underside thereof, and adjustable seed plungers radially threaded in the said wheel to pass through the said slots in the hopper bottom, the said hopper also having slots in its sides merging with the bottom slot, side bars mounted on the hopper on each side of the wheel and extending up alongside the said slots, plates secured across these ends of the bars, and having slots aligned with the slots in the hopper, and slotted seed blocks removably mounted between the ends of the said bars.

2. In a seed dropping device for a planter, a hopper with an upwardly bowed bottom and having a slot extended across its bottom and extensions of the slot upward into the sides of the hopper, a seed wheel journaled directly beneath the bowed and slotted hopper bottom, seed dispensing elements adjustably mounted in the periphery of the wheel and adapted to pass through the said slots, side bars mounted parallel alongside the seed wheel and turned up at their ends along the sides of the hopper, plates secured across the ends of the side bars spaced outwardly thereby from the hopper and having slots registering with the slots in the hopper sides, and slotted seed blocks removably mounted between the ends of the said side bars within the plates.

3. In a seed dropping device for a planter, a hopper with an upwardly bowed bottom and having a slot extended across its bottom and extensions of the slot upward into the sides of the hopper, a seed wheel journaled directly beneath the bowed and slotted hopper bottom, seed dispensing elements adjustably mounted in the periphery of the wheel and adapted to pass through the said slots, side bars mounted parallel alongside the seed wheel and turned up at their ends along the sides of the hopper, plates secured across the ends of the side bars spaced outwardly thereby from the hopper and having slots registering with the slots in the hopper sides, and seed blocks mounted between the ends of the side bars and having brush bristles adapted to engage the periphery of the seed wheel beneath the hopper.

GRADY W. HOLLIS.